(12) United States Patent
Amano et al.

(10) Patent No.: US 12,741,315 B2
(45) Date of Patent: Sep. 22, 2026

(54) POWDER, ARTICLE, AND METHOD OF MANUFACTURING ARTICLE

(71) Applicant: CANON KABUSHIKI KAISHA, Tokyo (JP)

(72) Inventors: Shota Amano, Kanagawa (JP); Rika Courquin, Tokyo (JP); Tsutomu Shimano, Tokyo (JP); Motoki Okinaka, Tokyo (JP); Yutaka Arai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 52 days.

(21) Appl. No.: 18/582,863

(22) Filed: Feb. 21, 2024

(65) Prior Publication Data

US 2024/0293865 A1 Sep. 5, 2024

(30) Foreign Application Priority Data

Mar. 3, 2023 (JP) ................................. 2023-032851
Jan. 23, 2024 (JP) ................................. 2024-008065

(51) Int. Cl.

*B22F 1/12* (2022.01)
*B22F 1/052* (2022.01)
*B22F 1/054* (2022.01)
*B22F 10/25* (2021.01)
*C04B 35/628* (2006.01)

(52) U.S. Cl.

CPC .............. *B22F 10/25* (2021.01); *B22F 1/052* (2022.01); *B22F 1/056* (2022.01); *B22F 1/12* (2022.01); *B22F 2302/05* (2013.01); *B22F 2302/105* (2013.01); *B22F 2302/25* (2013.01); *B22F 2304/054* (2013.01); *B22F 2304/10* (2013.01); *C04B 35/62892* (2013.01)

(58) Field of Classification Search

CPC ........... B22F 2302/105; B22F 2302/25; C04B 35/62892

See application file for complete search history.

(56) References Cited

U.S. PATENT DOCUMENTS 5,039,550 A 8/1991 Malghan et al.
5,098,740 A 3/1992 Tewari
2008/0269042 A1 10/2008 Carty
2009/0312477 A1 12/2009 Nishi et al.
2016/0083303 A1 3/2016 Mironets et al.
2017/0189960 A1 7/2017 Ibe
2018/0161870 A1 6/2018 Chen et al.
2019/0099914 A1 4/2019 Kitani et al.
2019/0143407 A1 5/2019 Imoto et al.
(Continued)

FOREIGN PATENT DOCUMENTS

EP 2 215 176 B1 1/2016
JP 8-91941 A 4/1996
(Continued)

OTHER PUBLICATIONS

Extended European Search Report in European Application No. 24160896.7 (Jul. 2024).

*Primary Examiner* — Adam Krupicka
(74) *Attorney, Agent, or Firm* — Venable LLP

(57) ABSTRACT

Provided is a powder for shaping through irradiation with an energy beam, the powder including: a sublimable substance; and a sublimation suppression material, wherein the sublimation suppression material is an inorganic compound, and wherein particles of the sublimation suppression material adhere to part of surfaces of particles of the sublimable substance.

26 Claims, 6 Drawing Sheets

(56) References Cited

U.S. PATENT DOCUMENTS

| | | | |
|---|---|---|---|
| 2019/0300441 | A1 | 10/2019 | Kubota et al. |
| 2020/0123062 | A1 | 4/2020 | Greulich-Weber et al. |
| 2020/0198007 | A1 | 6/2020 | Kitani et al. |
| 2022/0041514 | A1 | 2/2022 | Carty et al. |
| 2022/0111553 | A1 | 4/2022 | Kitani et al. |
| 2022/0324135 | A1 | 10/2022 | Okinaka |

FOREIGN PATENT DOCUMENTS

| | | | |
|---|---|---|---|
| JP | 2019-64226 | A | 4/2019 |
| JP | 2020-7170 | A | 1/2020 |
| JP | 2021-84363 | A | 6/2021 |
| JP | 2021-102548 | A | 7/2021 |
| WO | 2022/183527 | A1 | 9/2022 |

INTEGRATED FREQUENCY (%)

F(B)

F(A)

V

PARTICLE DIAMETER (μm)

POWDER, ARTICLE, AND METHOD OF MANUFACTURING ARTICLE

BACKGROUND OF THE DISCLOSURE

Field of the Disclosure

The present disclosure relates to a powder, an article shaped from the powder, and a method of manufacturing an article including using the powder.

Description of the Related Art

As a method of manufacturing an article having a complicated shape or a wide variety of articles in small quantities, so-called 3D printing, which is an additive manufacturing method including shaping a raw material powder through irradiation with laser based on three-dimensional data of an article to be manufactured, has been utilized. Further, in recent years, an attempt to utilize the additive manufacturing method in manufacturing an article formed of an inorganic compound material that is difficult to process, such as silicon carbide or TiAl, has been advanced.

Silicon carbide is a material showing excellent physical properties, such as light weight, high stiffness, high thermal conductivity, and high heat resistance. However, silicon carbide is a sublimable substance that does not have a melting point and is thermally decomposed at high temperature, and hence has been known as a material that is significantly difficult to use in the 3D printing through laser irradiation. In Japanese Patent Application Laid-Open No. 2019-64226, there is a disclosure of a method including adding a metal boride to silicon carbide to generate a melting point, followed by shaping. In addition, in Japanese Patent Application Laid-Open No. 2021-102548, there is a proposal of a method including using silicon carbide as a main component and adding a carbon powder and a silicon powder to be used as a binder of a silicon carbide powder through compounding of carbon and silicon, followed by shaping.

In Japanese Patent Application Laid-Open No. 2019-64226, there is a proposal of a method including melting a mixed powder of silicon carbide and the metal boride added thereto, followed by shaping in a state of a eutectic. In other words, shaping of an article having a high density can be expected because the mixed powder is formed into a melt once. In addition, when the carbon powder and the silicon powder are added to the silicon carbide powder, followed by shaping, as in Japanese Patent Application Laid-Open No. 2021-102548, shaping of an article having composition containing silicon carbide at 100% is enabled. However, shaping of an article having a higher density has been required.

To achieve the above-mentioned object, the present disclosure has an object to provide a powder that enables manufacture of an article containing a sublimable substance and having a high density, an article shaped from the powder, and a method of manufacturing an article including using the powder.

According to the present disclosure, there is provided a powder for shaping through irradiation with an energy beam, the powder including: a sublimable substance; and a sublimation suppression material, wherein the sublimation suppression material is an inorganic compound, and wherein particles of the sublimation suppression material adhere to part of surfaces of particles of the sublimable substance.

Further features of the present disclosure will become apparent from the following description of exemplary embodiments with reference to the attached drawings.

DESCRIPTION OF THE EMBODIMENTS

<<Powder>>

In a shaping method including applying an energy beam to perform shaping, such as powder bed fusion, a powder is irradiated with an energy beam such as laser light while being scanned with the energy beam, and the powder is melt in the order of milliseconds and is then solidified to form a solidified portion. When the series of steps is repeated a plurality of times, an article having a complicated shape (three-dimensional object) is obtained. Meanwhile, a raw material powder is required to have such a property that at least part of the powder is melt through irradiation with the energy beam. In the case of a metal, most of the substances each have a melting point and shaping thereof is easy. However, some ceramics do not have a melting point, and hence it has been known that their uses in the powder bed fusion are extremely difficult.

The inventors have found that sublimation of a sublimable substance is suppressed by covering part of surfaces of particles of the sublimable substance with particles of a sublimation suppression material, and thus a shaped object having a high density is obtained.

Figure 1A:
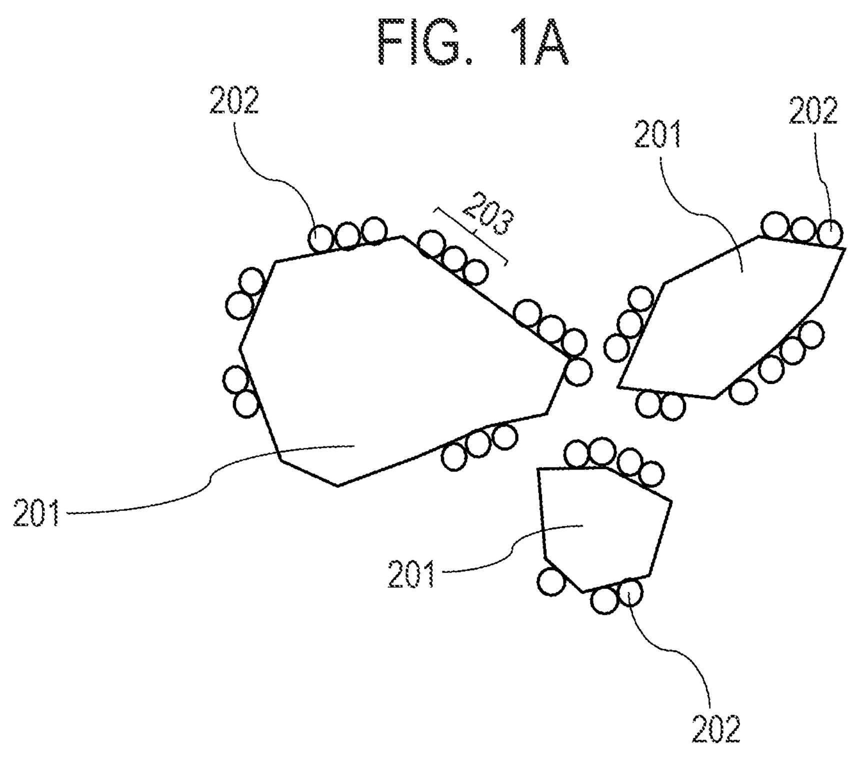
FIG. 1A and FIG. 1B are each an image view for illustrating an overview of a powder of the present disclosure.
Figure 1B:
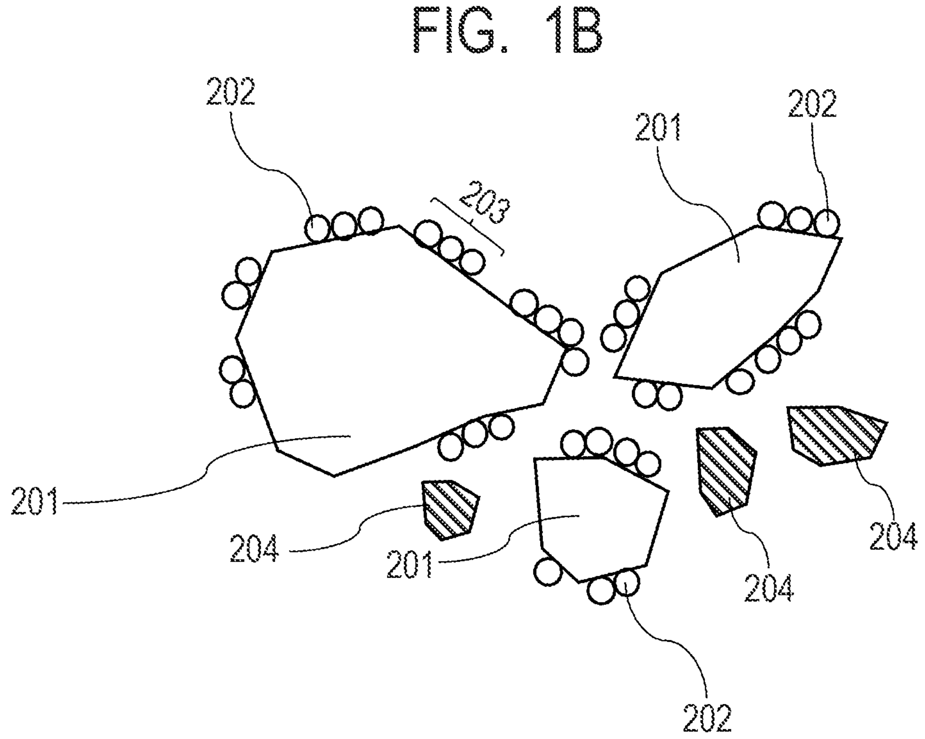

The powder of the present disclosure is a powder for shaping through irradiation with an energy beam such as laser light. More specifically, the powder is, for example, a powder material that can be used for manufacturing an article (shaped object) by powder bed fusion. The powder of the present disclosure contains a sublimable substance and a sublimation suppression material. In addition, the sublimation suppression material is an inorganic compound, and particles of the sublimation suppression material adhere to part of surfaces of particles of the sublimable substance. FIG. 1A and FIG. 1B are each an image view for illustrating an overview of the powder of the present disclosure. In an example of FIG. 1A, the powder of the present disclosure contains a plurality of particles 201 of the sublimable substance, particles 202 of the sublimation suppression material adhere to part of surfaces of the particles 201 of the sublimable substance, and part of the surfaces of the particles 201 of the sublimable substance are covered with the particles 202 of the sublimation suppression material. A plurality of the particles 202 of the sublimation suppression material may be aggregated to form a sublimation suppression material layer 203. The powder of the present disclosure may contain, as illustrated in FIG. 1B, particles 204 of a eutectic formation material. In an example of FIG. 1B, there is illustrated a state in which the particles 202 of the sublimation suppression material do not adhere to surfaces of the particles 204 of the eutectic formation material, but of course, the particles 202 of the sublimation suppression material may adhere to the surfaces of the particles 204 of the eutectic formation material.

Herein, to bond the particles 201 of the sublimable substance to each other, the surfaces of the particles 201 of the sublimable substance need to be exposed to some extent. In addition, it is preferred that the particles 202 of the sublimation suppression material adhere to 5% or more and 95% or less of the surfaces of the particles 201 of the sublimable substance from the viewpoint of a filling ratio of the article. In consideration of the bonding of the particles 201 of the sublimable substance to each other, it is more preferred that the particles 202 of the sublimation suppression material adhere to 10% or more and 40% or less of the surfaces of the particles 201 of the sublimable substance. When the coverage (ratio of an area of portions to which the particles of the sublimation suppression material adhere to cover the surfaces of the particles of the sublimable substance with respect to an area of the surfaces of the particles of the sublimable substance) is 5% or more, the sublimation of the sublimable substance can be sufficiently suppressed, and when the coverage is 95% or less, the particles of the sublimable substance can be sufficiently bonded to each other.

It is preferred that the particles 202 of the sublimation suppression material strongly adhere to the surfaces of the particles 201 of the sublimable substance with a van der Waals force or the like, and it is preferred that the particles 202 adhere to the surfaces of the particles 201 under the state in which the particles are brought into close contact with each other to the extent that the particles 202 are not easily peeled off.

The powder of the present disclosure preferably has a particle diameter distribution in which a plurality of peaks are present in the range of a particle diameter of from 0.5 μm to 200.0 μm.

Figure 2A:
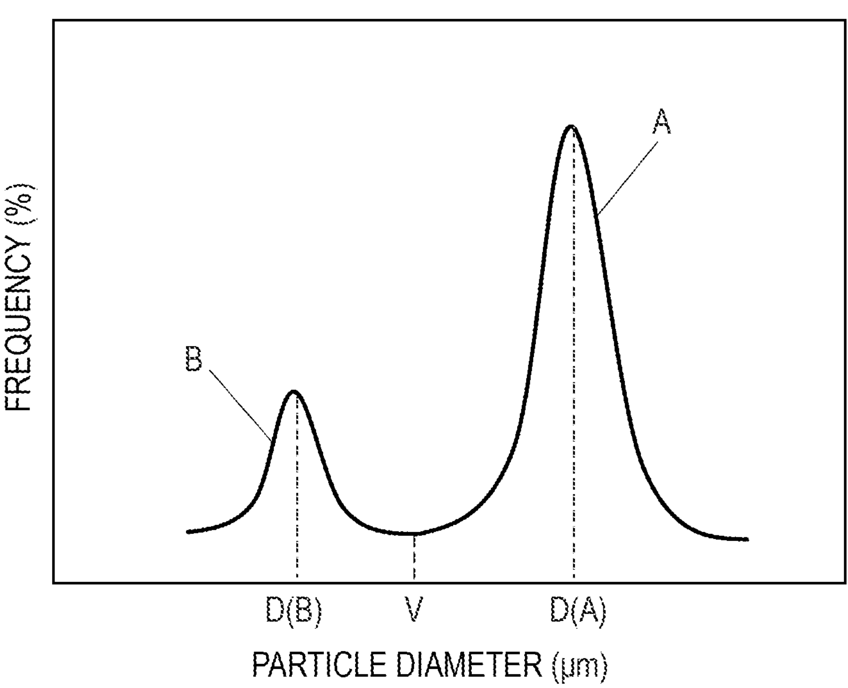
FIG. 2A, FIG. 2B, and FIG. 2C are each an image view when the powder of the present disclosure has a plurality of peaks.
Figure 2B:
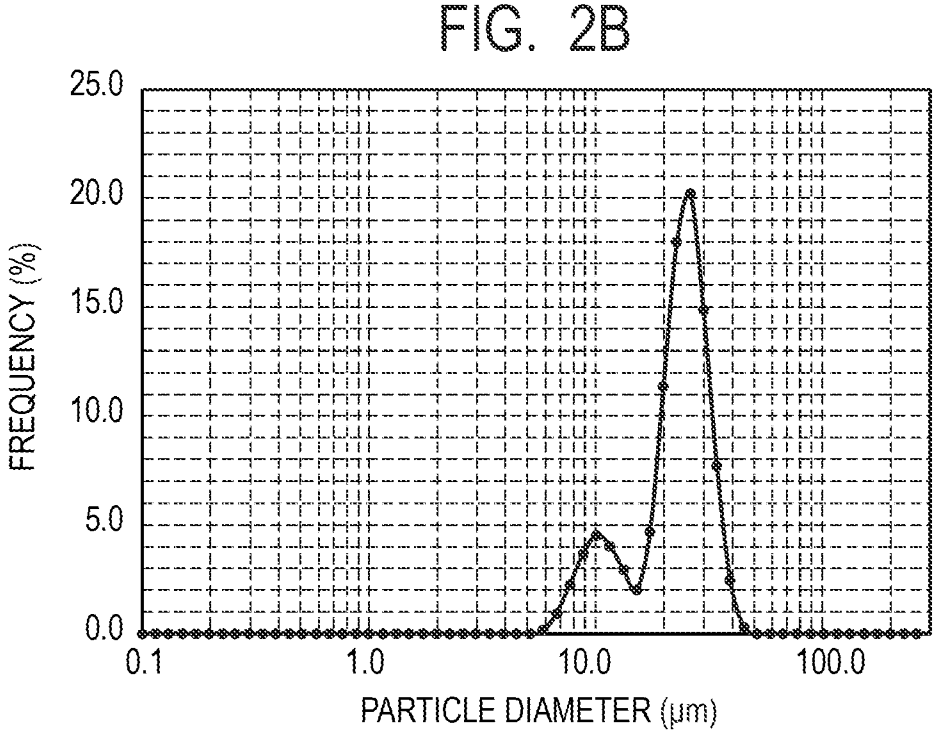
Figures 2C, 3:
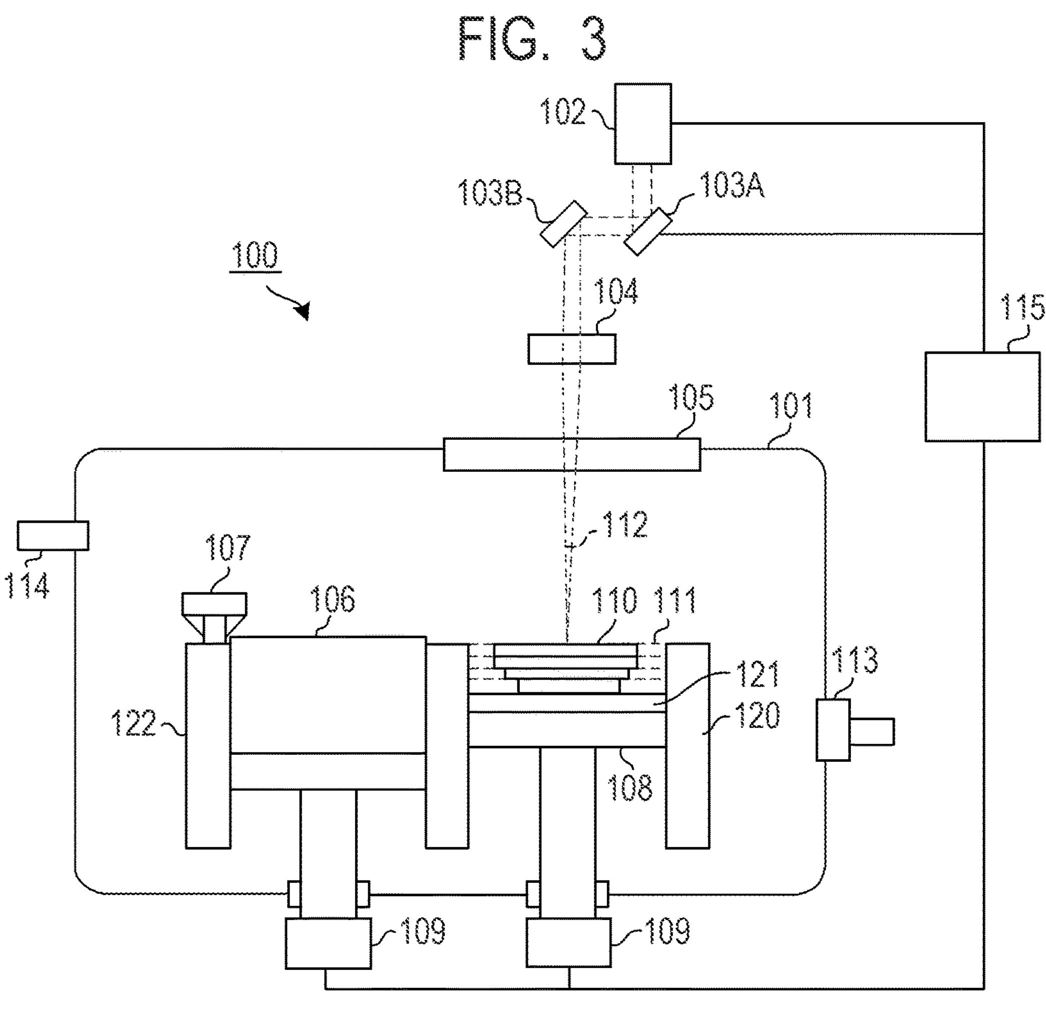
FIG. 3 is a view for illustrating an overview of a shaping apparatus to be used in powder bed fusion.

FIG. 2A, FIG. 2B, and FIG. 2C are each an image view when the powder of the present disclosure has a plurality of peaks. The "peak" means a portion protruding from a baseline, and refers to a maximum point in a particle diameter distribution curve. However, in the present disclosure, the "peak" is defined as having a frequency of Q % or more (e.g., 1% or more, preferably 2% or more, more preferably 3% or more) with respect to a total peak frequency in a particle diameter distribution.

In FIG. 2A, "A" represents a peak of particles having a large average particle diameter. Meanwhile, "B" represents a peak of particles having a small average particles. The average particle diameter of the particles with a peak A of the plurality of peaks, particles of the peak A having a large average particle diameter, is represented by D(A) μm, and an average particle diameter of the particles with a peak B of the plurality of peaks, particles of the second peak B having a smaller average particle diameter, is represented by D(B) μm. V represents a particle diameter of a local minimum value C between D(A) and D(B) in the particle size distribution curve. An integrated frequency ratio F is determined by dividing the particle diameters into smaller and larger particle diameters than the particle diameter V of the minimum value C.

A particle diameter that may be regarded as a particle diameter X may be set to $aX<X<bX$. Herein, "a" satisfies $0.8<a<1.0$, and "b" satisfies $1.0<b<1.2$. FIG. 2B is an example of an actually measured particle diameter distribution. In FIG. 2B, $0.9<a<1.0$ and $1.0<b<1.1$ are roughly satisfied, and typically, a=0.93 and b=1.07 are satisfied.

In FIG. 2B, which is an example of the actually measured particle diameter distribution of the powder of the present disclosure, the relationship between the particle diameter and the frequency ratio is as follows: 18.0% at 22.8 μm; 20.2% at 26.1 μm; and 14.9% at 29.9 μm. The peak A has a frequency of 20.2% at a particle diameter of 26.1 μm, but it is conceived that the particle diameter of 26.1 μm encompasses particles each having a particle diameter that falls within the range of from about 24.5 μm to about 28.0 μm. In addition, in FIG. 2B, the relationship between the particle diameter and the frequency ratio is as follows: 3.7% at 8.8 μm; 4.5% at 10.1 μm; and 4.0% at 11.6 μm. The peak B has a frequency of 4.5%. As in this example, A (20.2%)>B (4.5%) is preferred, but A<B may be adopted. However, a larger peak out of A and B preferably has a frequency of 10% or more. In FIG. 2B, the relationship between the particle diameter and the frequency ratio is as follows: 2.9% at 13.2 μm; 2.0% at 15.2 μm; and 4.7% at 17.4 μm. The minimum value C is 2.0%, and the particle diameter V is 15.2 μm. The minimum value C is, for example, less than 5%, preferably less than 4%, more preferably less than 3%. Further, the frequency at each of a particle diameter of 6.7 μm or less and a particle diameter of 44.9 μm or more is less than 1%.

As in FIG. 2C, for the content ratios of the respective particles, an integrated frequency ratio of particles having a large average particle diameter is represented by F(A), and an integrated frequency ratio of particles smaller than the particles is represented by F(B). In the figure, the integrated frequency value (crossing point with V) at the particle diameter V of the minimum value in a particle size distribution represents the frequency ratio F(B) of the smaller particles.

It is more preferred that, when the first particle diameter with a first peak (A) of the plurality of peaks is represented by D(A) μm, and the second particle diameter of the particles with a second peak (B) is represented by D(B) μm, the powder of the present disclosure have at least two peaks satisfying the following formula (1).

$$0.1 \leq D(B)/D(A) \leq 0.8 \quad (1)$$

When a plurality of peaks are present in the particle size distribution, small particles enter the gaps between large particles, and hence a void fraction is reduced and powder laying can be densely performed. Accordingly, a filling ratio of the shaped object can be improved.

In addition, in the peaks of the powder of the present disclosure, when an integrated frequency ratio of the particles having a large particle diameter than a particle diameter V between D(A) and D(B) is represented by F(A) and an integrated frequency ratio of the particles having a smaller average particle diameter than the particle diameter V between D(A) and D(B) is represented by F(B), F(A) is preferably larger than F(B). The frequency ratio F(A) of the particles having a large average particle diameter at the peak is more preferably 60% or more and 95% or less with respect to the total peak frequency.

When the frequency ratio of particles having a large average particle diameter is larger than that of particles having a small average particle diameter, a contact area between the particles is reduced, and hence fluidity suitable for uniformly forming a raw material powder layer can be obtained. In addition, the filling property of the raw material powder improves, and hence the filling ratio of the shaped object can also be improved. The average particle diameter means a median diameter. As the average particle diameter, for example, an average of values measured twice by a Fischer method for a measurement time of 30 seconds may be adopted.

<Sublimable Substance>

The sublimable substance is not particularly limited as long as the sublimable substance is a substance that sublimes at normal pressure, but is preferably a substance that does not have a melting point at normal pressure, more preferably a substance that is thermally decomposed at high temperature. Examples of the sublimable substance include silicon carbide (SiC), aluminum nitride (AlN), boron nitride (BN), and silicon nitride ($Si_3N_4$). Silicon carbide is a material that is thermally decomposed into silicon and carbon at 2,830° C. or more, and that sublimes near 3,600° C., and there is no temperature region that silicon carbide becomes a liquid phase.

The average particle diameter of the particles of the sublimable substance is preferably 0.5 μm or more and 200 μm or less, more preferably 1 μm or more and 70 μm or less, still more preferably 5 μm or more and 50 μm or less. When the average particle diameter of the particles of the sublimable substance falls within the above-mentioned ranges, particle fluidity suitable for densely laying the powder is obtained, and shaping of a fine shaped object is also enabled. Herein, the average particle diameter means a median diameter. As the average particle diameter, for example, an average of values measured twice by a Fischer method for a measurement time of 30 seconds may be adopted.

The content of the sublimable substance is preferably 90 mol % or more and 99.9 mol % or less, more preferably 98.5 mol % or more and 99.9 mol % or less with respect to the total of the contents of the sublimable substance and the sublimation suppression material.

<Sublimation Suppression Material>

The sublimation suppression material is not particularly limited as long as the sublimation suppression material is an inorganic compound that suppresses the sublimation of the sublimable substance. To impart such an effect that the sublimable substance becomes difficult to sublimate, a substance having a high boiling point or sublimation point is preferably selected as the sublimation suppression material. In addition, a material having a characteristic that improves fluidity of the sublimable substance and that aids bonding of adjacent powders is desirably used. Examples of the material that satisfies such characteristic include: inorganic oxides such as a metal oxide; inorganic nitrides such as a metal nitride; and inorganic carbides such as a metal carbide. More specific examples of the sublimation suppression material include $SiO_2$ (boiling point: 2,230° C.), $Al_2 O_3$ (boiling point: 2,977° C.), $ZrO_2$ (boiling point: 4,300° C.), $Y_2O_3$ (boiling point: 4,300° C.), and MgO (boiling point: 3,600° C.).

The boiling point or sublimation point of the sublimation suppression material is preferably sufficiently high, but is not necessarily higher than the sublimation point of the sublimable substance. This is because the sublimation suppression material absorbs the laser light, and hence the sublimation suppression material itself sublimes to suppress the sublimation of the sublimable substance. The boiling point of $SiO_2$ is, for example, 2,230° C., which is lower than the decomposition point of silicon carbide serving as the sublimable substance, that is, 2,830° C. However, the energy of the laser to be applied is consumed as sublimation heat of $SiO_2$, and hence sublimation of silicon carbide can be effectively suppressed. The boiling point or sublimation point of the sublimation suppression material is preferably Ts/2 or more where Ts represents the sublimation point of the sublimable substance.

The average particle diameter of the particles of the sublimation suppression material only needs to be small enough for adhering to the particles of the sublimable substance to cover the particles of the sublimable substance, and is preferably 10 nm or more and 300 nm or less. In addition, the particle diameter of each of the particles of the sublimation suppression material is preferably 1/10 or less of the particle diameter of each of the particles of the sublimable substance.

The content of the sublimation suppression material is preferably 0.1 mol % or more and 10 mol % or less, more preferably 0.1 mol % or more and 1.5 mol % or less with respect to the total of the contents of the sublimable substance and the sublimation suppression material.

<Eutectic Formation Material>

The powder of the present disclosure preferably further contains the eutectic formation material for forming a eutectic with the sublimable substance. The sublimable substance does not have a melting point, and hence it is difficult to obtain a dense shaped object from the sublimable substance alone. The eutectic formation material is preferably added to the sublimable substance because a molten state is obtained by heating, and hence there is a possibility in that the shaped object becomes denser. The eutectic formation material is not particularly limited as long as the eutectic formation material is a material for forming a eutectic with the sublimable substance. When the sublimable substance is silicon carbide, the eutectic formation material is preferably a metal boride. The metal boride is preferably at least one kind selected from $HfB_2$, $ZrB_2$, $TiB_2$, $TaB_2$, $NbB_2$, $CrB_2$, CrB, $VB_2$, $LaB_6$, $B_4C$, $W_2B_5$, and $WB_2$. Particles of the eutectic formation material are preferably different from those of the sublimable substance. The particle diameter of each of the particles of the eutectic formation material is preferably smaller than the particle diameter of each of the particles of the sublimable substance and is preferably larger than the particle diameter of each of the particles of the sublimation suppression material. The average particle diameter of the particles of the eutectic formation material is preferably 1 μm or more and 20 μm or less.

The content of the eutectic formation material is preferably set so that the ratio "x" [mol %] of the eutectic formation material with respect to the total of the contents of the eutectic formation material and the sublimable substance falls within the range that satisfies the following formula (2) or (3):

$$Xe/4 \leq x < 3Xe/4 \tag{2}$$

$$(3Xe+100)/4 < x \leq (Xe+300)/4 \tag{3}$$

in each of the formulae (2) and (3), Xe [mol %] represents a ratio of the eutectic formation material in the eutectic composition of the sublimable substance and the eutectic formation material.

Herein, when the content of the eutectic formation material is represented by "a" [mol] and the content of the sublimable substance is represented by "b" [mol], "x" [mol %]=a/(a+b)×100 is satisfied. In addition, with regard to the eutectic composition of the sublimable substance and the eutectic formation material, when the content of the eutectic formation material is represented by a' [mol] and the content of the sublimable substance is represented by b' [mol], Xe [mol %]=a'/(a'+b')×100 is satisfied.

A preferred range of the ratio "x" [mol %] of the eutectic formation material is specifically shown in Table 1.

TABLE 1

| Material | Xe [mol %] | x [mol %] |
|---|---|---|
| $HfB_2$ | 24 | 6.0 ≤ x ≤ 18.0, 43.0 ≤ x ≤ 81.0 |
| $LaB_6$ | 26 | 6.5 ≤ x ≤ 19.5, 44.5 ≤ x ≤ 81.5 |
| $ZrB_2$ | 28 | 7.0 ≤ x ≤ 21.0, 46.0 ≤ x ≤ 82.0 |
| $TiB_2$ | 34 | 8.5 ≤ x ≤ 25.5, 50.5 ≤ x ≤ 83.5 |
| $TaB_2$ | 35 | 8.8 ≤ x ≤ 26.3, 51.3 ≤ x ≤ 83.8 |
| $NbB_2$ | 39 | 9.8 ≤ x ≤ 29.3, 54.3 ≤ x ≤ 84.8 |
| $VB_2$ | 50 | 12.5 ≤ x ≤ 37.5, 62.5 ≤ x ≤ 87.5 |
| $W_2B_5$ | 70 | 17.5 ≤ x ≤ 52.5, 77.5 ≤ x ≤ 92.5 |
| $CrB_2$ | 75 | 18.8 ≤ x ≤ 56.3, 81.3 ≤ x ≤ 93.8 |

<Method of Manufacturing Powder>

A method of manufacturing the powder of the present disclosure is not particularly limited, but the powder may be manufactured by, for example, mixing the sublimable substance and the sublimation suppression material with a shaker. In addition, the powder may also be manufactured by, for example, a gas phase method, such as vapor deposition, sputtering, or CVD, or a liquid phase method including drying a slurry formed of the sublimable substance and the sublimation suppression material. Of those, mixing with a shaker is preferred because a strongly covered state can be easily obtained. The coverage with the sublimation suppression material may be controlled by the amount of the sublimation suppression material.

<<Article (Shaped Object)>>

An article of one embodiment of the present disclosure is shaped from the powder of the present disclosure.

In addition, an article of another embodiment of the present disclosure includes the sublimable substance such as silicon carbide, the sublimation suppression material, and the eutectic formation material for forming a eutectic with a sublimable substance, such as a metal boride, and the ratio "x" [mol %] of the eutectic formation material with respect to the total of the eutectic formation material and the sublimable substance satisfies the following formula (2) or (3):

$$Xe/4 \leq x < 3Xe/4 \quad (2)$$

$$(3Xe+100)/4 < x \leq (Xe+300)/4 \quad (3)$$

in each of the formulae (2) and (3), Xe [mol %] represents the ratio of the eutectic formation material in the eutectic composition of the sublimable substance and the eutectic formation material.

In the powder bed fusion or the like, it is important to control the temperature of the powder by an energy beam such as the laser light for suppressing the sublimation of the sublimable substance. When the laser light is used as the energy beam, to control the temperature of a laser light irradiation portion, control of an output power of the laser light, a scanning speed of the laser light, a scanning interval of laser, and a thickness of the powder is regarded to be important. The inventors have made investigations on the conditions of dispersion irradiation with the laser light and a defocus amount of the laser light for suppressing the sublimation of the sublimable substance in addition to those parameters. Now, a schematic configuration of a shaping apparatus and a method of manufacturing an article are described.

<Shaping Apparatus>

An overview of a shaping apparatus 100 to be used in the powder bed fusion is illustrated in FIG. 3. The shaping apparatus 100 includes a chamber 101 including a gas introduction port 113 and an exhaust port 114 arranged therein, and a gas is introduced from the gas introduction port 113 and is evacuated from the exhaust port 114. Thus, an atmosphere of an inside of the chamber can be controlled. To adjust a pressure, a pressure-adjusting mechanism such as a butterfly valve may be connected to the exhaust port 114, or a configuration (generally called "blow purge") in which an atmosphere in the chamber can be adjusted in association with gas supply and an increase in pressure along with the gas supply may be connected thereto. FIG. 3 is an example of the shaping apparatus, but is not limited thereto and may be appropriately modified.

The chamber 101 includes, in an inside thereof: a shaping container 120 for shaping a three-dimensional object; and a powder container 122 for storing a raw material powder (hereinafter sometimes simply referred to as "powder") 106. The positions of the bottoms of the shaping container 120 and the powder container 122 may each be changed in a vertical direction by a lifting mechanism 109. The bottom of the shaping container 120 also functions as a shaping stage 108 where a base plate 121 may be set.

The raw material powder stored in the powder container 122 is conveyed to the shaping container 120 by a powder laying mechanism 107 and is laid on the base plate 121 set on the shaping stage 108. A moving direction and a moving amount of the lifting mechanism 109 are controlled by a control unit 115 in accordance with the thickness of the raw material powder to be laid on the base plate 121. The position accuracy of the lifting mechanism 109 is desirably 1 μm or less in consideration of shaping accuracy.

The control unit 115 is a computer for controlling the operation of the shaping apparatus 100 and includes, for example, a CPU, a ROM, a RAM, and an I/O port in an inside thereof. An operation program of the shaping apparatus 100 is stored in the ROM. The I/O port is connected to an external device or a network, and, for example, input and output of data required for the shaping may be performed between the shaping apparatus 100 and an external computer. Examples of the data required for the shaping include information of the raw material powder and slice data. The slice data may be received from the external computer, shape data of a three-dimensional model serving as an object to be shaped may be acquired and its slice data is produced by the CPU in the control unit 115 to be stored in the RAM. The slice data refers to data obtained by slicing the shape data of the three-dimensional model serving as an object to be shaped in one direction, and is data for applying laser light 112 in accordance with the cross-sectional shape of the three-dimensional model.

The powder laying mechanism 107 is movable in a horizontal direction, and includes at least one of a squeegee or a roller for conveying a raw material powder 106 from the powder container 122 to the shaping container 120 to lay and flatten the raw material powder to a thickness corresponding to one layer of the slice data. To improve the density of the shaped object, a configuration, in which the powder laying mechanism 107 includes both of the squeegee and the roller, and the thickness of the raw material powder 106 to be laid is adjusted with the squeegee and then the raw material powder 106 is pressurized with the roller, is preferred. The raw material powder 106 laid and flattened to a thickness corresponding to one layer of the slice data is called “powder layer” below for convenience.

The shaping apparatus 100 includes: a laser light source 102 for melting the laid raw material powder 106; scanning mirrors 103A and 103B for scanning with the laser light 112 in two axes; and an optical system 104 for focusing the laser light 112 on an irradiation portion. The laser light 112 is applied from an outside of the chamber 101, and hence an introduction window 105 for introducing the laser light 112 to an inside is arranged on the chamber 101. Various parameters with regard to the laser light 112 are controlled by the control unit 115. The positions of the shaping container 120 and the optical system 104 are suitably adjusted in advance so that a beam diameter of the laser light becomes a desired value on the surface of the laid raw material powder 106. The beam diameter on the surface of the laid raw material powder 106, which affects shaping accuracy, is preferably set to 30 μm or more and 100 μm or less.

A galvano mirror may be suitably used as each of the scanning mirrors 103A and 103B. The galvano mirror is operated at high speed while allowing the laser light to be reflected, and hence is desirably formed of a material that is light weight and has a low linear expansion coefficient.

A YAG laser having a high general-purpose property is used as the laser light source 102 in many cases, but, for example, a $CO_2$ laser or a semiconductor laser may be used. The driving system may be a pulse system or a continuous irradiation system. Light having a wavelength corresponding to an absorption wavelength of the raw material powder 106 may be selected as the laser light 112. It is preferred to use, as the laser light 112, light having a wavelength at which the raw material powder 106 has an absorption rate of 50% or more. It is more preferred to use light having a wavelength at which the raw material powder 106 has an absorption rate of 80% or more.

It is desired that a heating mechanism for heating the powder at the periphery of the laser light irradiation portion be arranged as required. The heating mechanism may be, for example, a heater arranged in the shaping container 120, or may be a laser light source separately provided from the laser light source 102.

Specifically, when the base plate 121 excellent in thermal conductivity is used, heat diffuses into the periphery thereof via the base plate 121 in an early stage of the shaping, and hence the temperature of the powder cannot be sufficiently increased. Accordingly, it sometimes becomes difficult to join a solidified portion 110 to the base plate 121. As the shape advances and the height of the shaped object increases, diffusion of heat via the base plate 121 is reduced. However, when the sublimable substance is silicon carbide, a state in which the shaped object is embedded in the powder of silicon carbide having a high thermal conductivity occurs, and hence heat is released via the powder of silicon carbide, and hence there is a tendency that the temperature of the powder in the laser light irradiation portion cannot be sufficiently increased.

To alleviate such state, it is preferred that the shaping apparatus 100 be designed so as not to reduce the temperature of the powder in the laser light irradiation portion. For example, it is desired that the heating mechanism be arranged in the shaping container 120 and an inside of the shaping container 120 be entirely preheated. A heating mechanism that can heat the powders in the solidified portion (shaped object) 110 and an unsolidified portion 111 to 30° C. or more and 100° C. or less is preferred as the heating mechanism. Specifically, it is desired that a heater be arranged near the shaping container 120. In addition, a configuration in which a laser for preheating the powder is arranged in addition to the laser for melting the powder to locally heat the powder in the periphery of the laser light irradiation portion is also preferred. When the preheating temperature is less than 30° C., heat diffuses at the time of the laser light irradiation and the raw material powder cannot be sufficiently melted, and hence a space occurs between the base plate 121 and the solidified portion 110 or a solidified layer to be laminated with the solidified portion 110. Accordingly, peeling may occur. When the preheating temperature is more than 100° C., such a tendency that the raw material powder is liable to aggregate is found.

<Method of Manufacturing Article>

Subsequently, a method of manufacturing an article of the present disclosure is described by taking the powder bed fusion as an example. The method of manufacturing an article of the present disclosure includes a plurality of times of each of a step of laying the powder of the present disclosure to form a powder layer and a step of irradiating the powder layer with an energy beam.

Specifically, the base plate 121 is arranged on the shaping stage 108, and an inside of the chamber 101 is purged with an inert gas, such as nitrogen or argon. After the purging of the atmosphere in the chamber 101 is completed, the powder layer is formed on a shaping surface of the base plate 121 by the powder laying mechanism 107. As described above, the thickness of the powder layer is determined based on a slice pitch of slice data generated from the shape data of the three-dimensional model to be shaped. Herein, the shaping surface refers to a surface on which a new powder layer is formed.

The powder layer is scanned with the laser light 112 in accordance with the slice data, and the raw material powder 106 in a region corresponding to the cross-sectional shape of the three-dimensional model is irradiated with the laser light. A region irradiated with the laser light 112 is solidified to become the solidified portion 110 after the raw material powder 106 is melted, and a region prevented from being irradiated with the laser light 112 becomes the unsolidified portion 111 while being kept in a powder state.

When the laser light irradiation is completed, the control unit 115 controls the lifting mechanism 109 to lower the shaping stage 108 and raise the bottom of the powder container 122. Then, the raw material powder 106 in the powder container 122 is conveyed to the shaping container 120 by the powder laying mechanism 107, and a new powder layer is formed on a shaping surface formed of the solidified portion 110 and the unsolidified portion 111. Then, in accordance with slice data corresponding to a next layer, the layer is irradiated with the laser light 112 while being scanned with the light. Now, the solidified portion 110 corresponding to one layer of the slice data is called a solidified layer, and an object in which the solidified layers are laminated and integrated with each other is sometimes called a shaped object.

The base plate 121 is formed of a material that can be melted by the laser light 112, such as stainless steel or ceramics. When the powder layer formed first on the base plate 121 is melted and solidified, the laser light is applied under the condition in which part of the surface of the base plate 121 is melted together with the raw material powder 106, and the solidified layer serving as a first layer and the base plate 121 are joined to each other. It is desired that the powder layers serving as a second layer and subsequent layers to be formed on the shaping surface including the solidified portion 110 be irradiated with the laser light under the condition in which a solidified layer to be newly formed and the solidified portion 110 formed in advance are joined to each other. When the shaping is performed so that the solidified layer to be newly formed and the solidified portion 110 formed in advance are joined to each other, the shaped object is fixed to the base plate 121 as a result, and hence a position shift of the shaped object is suppressed during the shaping. After the completion of the shaping, the base plate 121 is mechanically separated from the shaped object. After that, the shaped object may be subjected to heat treatment as required.

As described above, when the step of forming the powder layer by laying the raw material powder on the shaping surface and the step of irradiating the powder layer with the energy beam such as the laser light 112 while scanning the layer with the energy beam are performed a plurality of times, an article (shaped object or three-dimensional object) in which the solidified layers are integrated with each other can be manufactured.

[Energy Density of Laser Light]

In the powder bed fusion, the temperature of a powder bed surface is controlled by the irradiation conditions of the laser light. As a method of controlling the irradiation energy of the laser light, there are given a method of controlling an in-plane energy density and a method of controlling a space energy density. The in-plane energy density refers to a laser light irradiation intensity per unit area, and is represented in the unit of $J/mm^2$. The space energy density refers to a laser light irradiation intensity per unit volume, and is represented in the unit of $J/mm^3$. When the thickness of the raw material powder is controlled to form the shaped object as in the powder bed fusion, it is suitable to consider the space energy density. A space energy density JV is represented by the following formula.

$$JV = W/(P \times V \times D)$$

W: output power of laser light

P: irradiation pitch (scanning interval) of laser light

V: scanning speed of laser light

D: thickness of powder layer

In a general shaping apparatus, the laser power W may be adjusted within the range of 10 W or more and 1,000 W or less, the irradiation pitch P of the laser light may be adjusted within the range of 5 μm or more and 500 μm or less, the scanning speed V of the laser light may be adjusted within the range of 10 mm/sec or more and 10,000 mm/sec, and the thickness D of the powder layer may be adjusted within the range of 5 μm or more and 500 μm or less. The space energy density JV may be controlled by setting the parameters W, P, V, and D within the above-mentioned ranges as guidelines. The space energy density JV is preferably 11 $J/mm^3$ or more and 250 $J/mm^3$ or less.

[Laser Light Scanning Method and Irradiation Spot]

To stably perform shaping using the powder of the present disclosure, it is important to reduce temperature unevenness that occurs in a laser irradiation region. Accordingly, it is preferred to control a scanning method or a temperature profile in an irradiation spot in addition to the control of the space energy density JV in the laser light irradiation.

{Scanning Method}

Figure 4A:
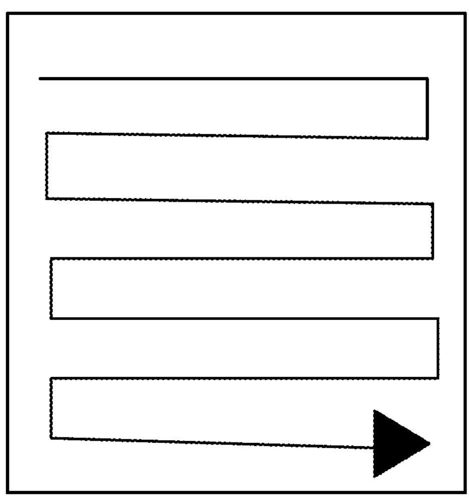
FIG. 4A and FIG. 4B are each a view for illustrating a laser light scanning method.
Figure 4B:
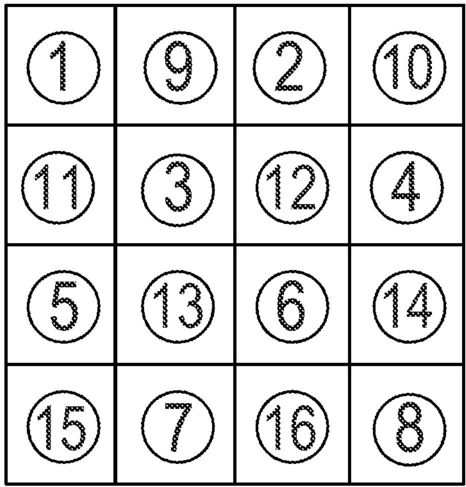

First, a suitable scanning method is described. FIG. 4A and FIG. 4B are each a schematic view for illustrating a laser light scanning method. When the shaped object is continuously scanned with the laser light from an end thereof in a traversable manner in accordance with the shape of the shaped object as illustrated in FIG. 4A, irradiation heat accumulates at a turning point of the scanning, and hence the temperature may locally increase. As a result, the composition of the shaped object may be varied, and the ratio of pores may increase.

However, when dispersion irradiation with the laser light is performed, a local temperature increase can be suppressed, and the irradiation heat in the shaping surface can be uniformized. Specifically, as illustrated in FIG. 4B, it is suitable that the irradiation region be sectioned in a rectangular shape and subjected to discrete irradiation. For example, it is suitable to perform the discrete irradiation in the irradiation order indicated by circled figures in each region of FIG. 4B. The size of the irradiation region is preferably a rectangular shape having a length of one side of 1 mm or more and 5 mm or less and an area of 1 $mm^2$ or more and 25 $mm^2$ or less. The shape of the irradiation region is not necessarily rectangular, and the shape may be polygonal or circular, or a combination thereof as long as the area is 1 $mm^2$ or more and 25 $mm^2$ or less, but it is more preferred that the plane can be filled with one kind of shape or a combination of a small number of several kinds of shapes. When the irradiation region is sectioned in a rectangular shape, the size of one section is preferably 5 mm×5 mm or less, more preferably 2 mm×2 mm or less.

At the time of the dispersion irradiation, of the two solidified layers that are continuously formed, in the solidified layer to be formed later, an angle in a shaping plane is preferably rotated by a predetermined amount while an irradiation area is moved in parallel in a constant direction by a predetermined amount in the shaping surface with respect to the solidified layer formed in advance. With those designs, temperature uniformity in the shaping surface can be secured. Accordingly, for example, the shaped object is in a state in which quadrangular columns formed by laminating square solidified layers are lined up. Accordingly, a reduction in strength such as a state in which the shaped object is liable to break owing to a weak joining strength between the quadrangular columns can be suppressed, and a shaped object having a high strength can be obtained.

{Irradiation Spot}

Next, the control of the temperature profile in the irradiation spot is described. The temperature profile of the irradiation spot may be adjusted by a defocused state of the laser light to be applied to the powder. When the defocused state is suitably adjusted, the temperature unevenness in the laser irradiation region can be reduced.

Figure 5A:
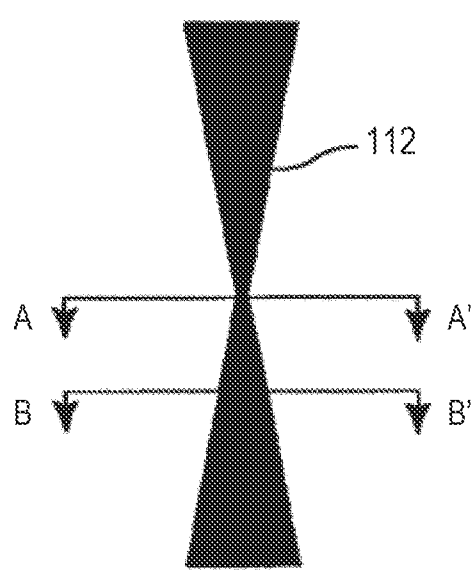
FIG. 5A and FIG. 5B are each a conceptual view for illustrating a focus position and a defocus position of the laser light.
Figure 5B:
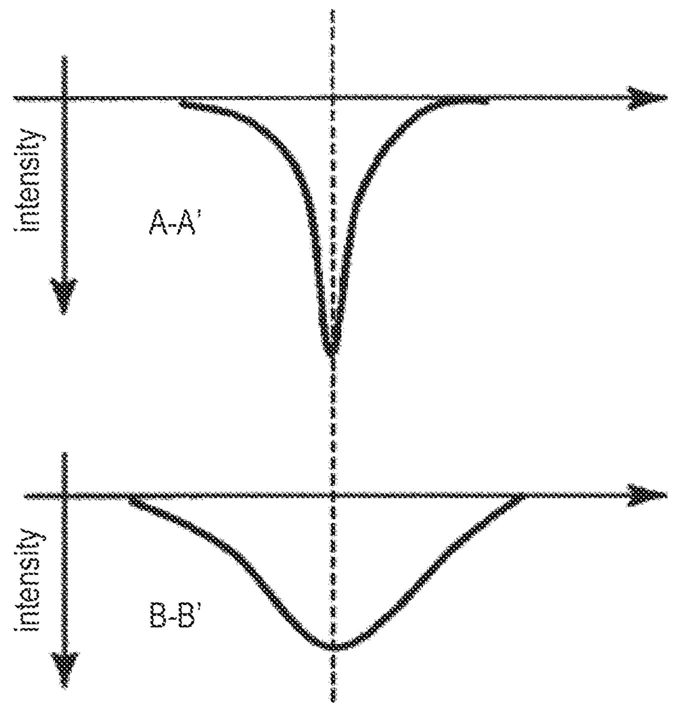

The temperature profile in the irradiation spot with the laser light is correlated with a light intensity distribution in the irradiation spot. The light intensity distribution in the irradiation spot is a Gaussian distribution in which the intensity is reduced from the center portion to the periphery of the spot. A focused state and the defocused state are described with conceptual views of FIG. 5A and FIG. 5B. FIG. 5A is a view for illustrating a focus position and a defocus position of the laser light, and FIG. 5B is a view for illustrating light intensity distributions in the focus position and defocus position of the laser light. The focused state refers to a state in which the laser light is focused on a surface of a laid powder, and the defocused state refers to a state in which the laser light is not focused on the surface of the laid powder. It can be said that the defocused state refers to a state in which a focus position to be identified from a focal distance of a light collection optical system of an apparatus used is shifted from the surface of the laid powder.

The light intensity distribution in a focus position (cross-section taken along the line A-A' of FIG. 5A) of the laser light 112 shows a sharp Gaussian distribution as illustrated in the top of FIG. 5B. Meanwhile, the light intensity distribution in a defocus position (near the cross-section taken along the line B-B' of FIG. 5B) of the laser light 112 shows a moderate light intensity distribution as compared to the focus position as illustrated in the bottom of FIG. 5B.

As described above, particularly in the focus position, a difference between light intensities of a center portion and a periphery portion of the irradiation spot becomes large. Accordingly, when the raw material powder is irradiated with the laser light in the focused state, a large temperature gradient is caused in the irradiation region, it is difficult to perform uniform melting. However, when the raw material powder is irradiated with the laser light in the defocused state, the temperature gradient in the irradiation spot can be made small, and hence the temperature can be adjusted to a temperature in which the powder is melted.

The method including applying the laser light in the defocused state has been described as a method of adjusting the temperature profile in the irradiation spot, but the method is not limited thereto. For example, the raw material powder may be irradiated with the laser light having a light intensity adjusted to a top hat type or donut type distribution through use of a beam shaping element.

Figure 6:
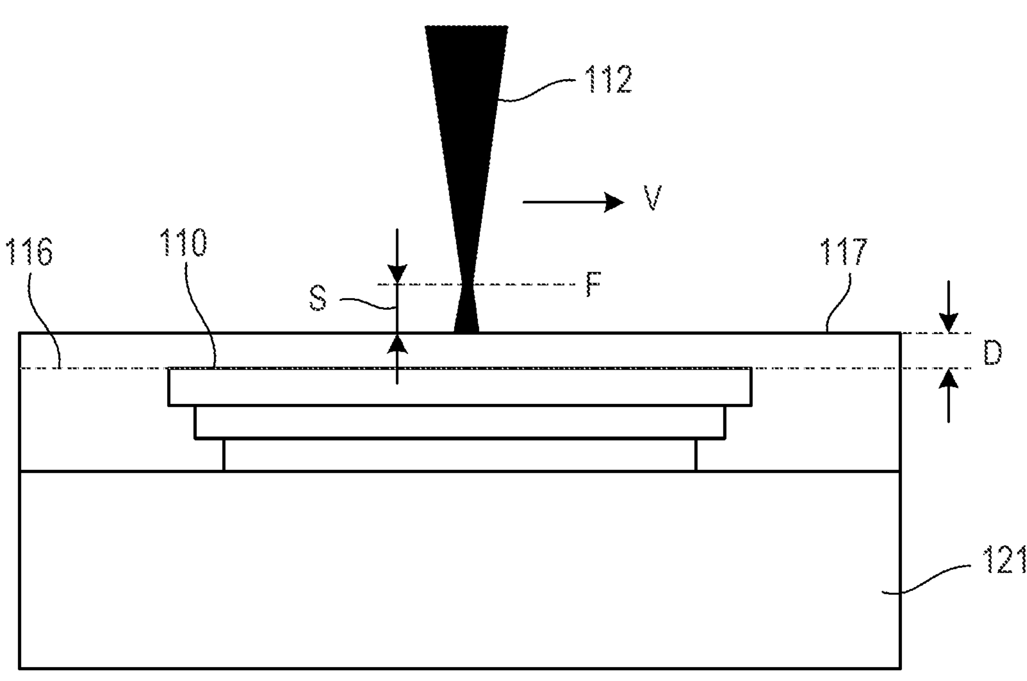
FIG. 6 is a schematic view for illustrating a state in which the laser light is applied in a defocused state.

A state in which a powder layer 117 is irradiated with the laser light 112 in the defocused state is illustrated in FIG. 6. In FIG. 6, a focus position F is shifted to an opposite side to a shaping surface 116 with respect to a surface of the powder layer 117.

The following two patterns are considered as a defocusing method: a case in which the focus position F of the laser light 112 is shifted to the opposite side to the shaping surface 116 with respect to the surface of the powder layer 117; and a case in which the focus position F is shifted to the shaping surface 116 side. However, when the irradiation is performed while the focus position F is shifted to the shaping surface 116 side with respect to the surface of the powder layer 117, the temperature of the solidified portion 110 or the raw material powder below the powder layer may increase to 3,600° C. or more. In such case, when the sublimable substance is silicon carbide, powder flying may occur by sublimation to cause a pore in the solidified portion 110, or a solidified portion not based on the slice data may be formed.

Accordingly, when the powder layer 117 is irradiated with the laser light 112 in the defocused state, it is preferred that an optical system be adjusted so that, as illustrated in FIG. 6, the focus position F of the laser light 112 is shifted to above the surface of the powder layer 117, that is, the opposite side to the shaping surface 116 with respect to the surface. When the distance (defocus amount) S between the focus position F and the surface of the powder layer 117 is too small, the temperature gradient in the irradiation region cannot be reduced, and hence bumping by a molten powder is liable to occur. In addition, when the defocus amount S is too large, a high output power may be needed, or the powder may not be melted owing to the shortage of irradiation energy and hence the shaping cannot be performed. When the temperature profile in the irradiation spot with the YAG laser is adjusted by the defocus amount, the defocus amount S is preferably 5 mm or more and 10 mm or less, though the defocus amount S depends on the optical system of the shaping apparatus to be used.

[Thickness of Powder Layer]

To laminate a plurality of the solidified layers to form one shaped object, the solidified layer formed in advance and the solidified layer to be formed next are preferably joined to each other. To join the solidified layers to each other, it is desired that a melt generated by the laser light irradiation be immersed into the vicinity of a surface of the solidified layer formed in advance. Such state may be achieved by adjusting the thickness of the powder layer to be formed. According to the investigations made by the inventors, the thickness of the powder layer that may be shaped while the melt is immersed into the vicinity of the surface of the solidified layer formed in advance to join the solidified layers to each other is 5 μm or more and 200 μm or less, though the thickness may depend on shaping conditions. The thickness of the powder layer is more preferably 20 μm or more and 75 μm or less.

[Impregnation Step]

The article produced by the method according to the present disclosure includes a pore in an inside thereof, and hence its density is desirably further improved by further performing a step of forming silicon carbide by impregnating a carbon source and a silicon source, such as silicon, polycarbosilane, polysiloxane, or a liquid resin, in accordance with applications. Solid phase impregnation, liquid phase impregnation, and gas phase impregnation have been known as a method for the impregnation. Of those, solid phase impregnation and liquid phase impregnation are preferred because the density of the shaped object can be improved comparably easily. Solid phase impregnation is particularly preferred because the density can be improved in a short time period. When the density of the shaped object is to be improved by the impregnation, heat treatment after the impregnation to be described later may also serve as the heat treatment described above.

When the shaped object containing silicon carbide as a main component is subjected to the solid phase impregnation, it is desired that carbon be supported in a pore of the shaped object and then molten silicon be absorbed therein, to thereby change the pore portion to silicon carbide. A specific procedure for the solid phase impregnation is as described below. First, the shaped object is impregnated in the liquid resin to be defoamed in a vacuum. Thus, the liquid resin is impregnated in the pore. An unnecessary liquid resin on a surface of the shaped object is removed, and then the resin is heated to be cured, and the resultant is further heated until the resin is carbonized. Thus, carbon is supported in the pore. Subsequently, the resultant shaped object is brought into contact with silicon melted in a vacuum to impregnate the silicon in the pore. Then, the resultant is heated at 1,450° C. or more and 1,700° C. or less. Thus, the pore portion may be changed to silicon carbide. The vacuum degree at the time of the impregnation of silicon is preferably 500 Pa or more and 50,000 Pa or less, more preferably 1,000 Pa or more and 10,000 Pa or less, still more preferably 1,000 Pa or more and 5,000 Pa or less. After the pore portion is changed to silicon carbide, excess silicon adheres to the surface of the shaped object, but may be removed by posttreatment, such as polishing or etching.

A resin free of a metal component is preferably used as a resin for allowing carbon to be supported in the pore of the shaped object. When the resin contains a metal component, the metal component may react with silicon in the shaped object to generate an excess silicide compound. In addition, as a residual carbon ratio of the resin is higher, a silicon carbide ratio of the pore portion can be increased. The residual carbon ratio of the resin is preferably 50% or more, more preferably 60% or more, and a phenol resin is particularly preferred as the resin. In addition, to cause the resin to permeate the pore, the viscosity of the resin is preferably 1,000 mPa's or less, more preferably 500 mPa's or less.

When the shaped object of the silicon carbide is subjected to the liquid phase impregnation, a commercially available silicon carbide polymer (e.g., a product available under the product name "SMP-10" from Starfire) may be used as an impregnation material. The produced shaped object is immersed in a silicon carbide polymer liquid to be subjected to vacuum defoaming. Thus, the silicon carbide polymer liquid is introduced in the pore of the shaped object. An excess liquid is removed from the surface of the shaped object, and then heat treatment is performed at 400° C. or more and 850° C. or less in an inert gas to mineralize the silicon carbide polymer. The silicon carbide polymer is a silicon carbide ceramics precursor containing an organic substance, and hence about 30 wt % thereof is lost by volatilization through the heat treatment. Accordingly, the porosity of the shaped object can be reduced by repeating the steps of the impregnation and the heat treatment a plurality of times. The silicon carbide obtained by subjecting the silicon carbide polymer to heat treatment at 400° C. or more and 850° C. or less has an amorphous structure. The characteristics may be improved through crystallization by performing heat treatment at 1,500° C. or more and 1,600° C. or less later as required.

As required, the shaped object in which the impregnation is completed is further subjected to postprocessing, such as polishing or cutting, to become an article containing silicon carbide as a main component.

EXAMPLES

Examples according to the present disclosure are described. However, kinds, compositions, particle forms, and shapes of powders, laser powers, and the like described below should be modified in accordance with a configuration and various conditions of an apparatus to which the invention is applied, and are not intended to limit the invention to the scope disclosed herein.

Average particle diameters of particles of sublimable substances C and D were adjusted to desired average particle diameters by classification. As an apparatus to be used in the classification, for example, a classifier or a sifter, such as: TURBOPLEX, TSP SEPARATOR, or TTSP SEPARATOR (manufactured by Hosokawa Micron Corporation); or ELBOW-JET (manufactured by Nittetsu Mining Co., Ltd.) is suitably used alone or in combination thereof.

Now, sublimable substances A to D, sublimation suppression materials A and B, and eutectic formation materials A to C used in Examples are shown in Tables 2 to 4.

<<Material>

(1) Sublimable Substance

TABLE 2

| | Material name | Average particle diameter [μm] | Product name | Sublimation point [° C.] |
|---|---|---|---|---|
| A | Silicon carbide | 25.0 | Pacific Rundum Co., Ltd. "NGH-BD #500" | About 3,600 |
| B | Silicon carbide | 11.5 | Pacific Rundum Co., Ltd. "NGH-BD #1000" | About 3,600 |
| C | Silicon carbide | 19.8 | Product obtained by adjusting average particle diameter of sublimation substance A by classification | About 3,600 |

TABLE 2-continued

| | Material name | Average particle diameter [μm] | Product name | Sublimation point [° C.] |
|---|---|---|---|---|
| D | Silicon carbide | 2.7 | Product obtained by adjusting average particle diameter of sublimation substance B by classification | About 3,600 |

(2) Sublimation Suppression Material

TABLE 3

| | Material name | Average particle diameter [nm] | Product name | Boiling point [° C.] |
|---|---|---|---|---|
| A | $SiO_2$ | 120 | Cabot Specialty Chemicals, Inc. "TGC-191" | 2,230 |
| B | $Al_2O_3$ | 170 | Sumitomo Chemical Co., Ltd. "AKP-170" | 2,977 |

(3) Eutectic Formation Material

TABLE 4

| | Material name | Average particle diameter [um] | Product name | Melting point [° C.] |
|---|---|---|---|---|
| A | $CrB_2$ | 3.0 to 6.0 | Japan New Metals Co., Ltd. "$CrB_2$—O" | 2,473 |
| B | $VB_2$ | 2.0 to 5.0 | Japan New Metals Co., Ltd. "$VB_2$—O" | 2,673 |
| C | $LaB_6$ | 7.0 to 11.0 | Japan New Metals Co., Ltd. "$LaB_6$—O" | 2,803 |

Example 1

1. Manufacture of Powder

The sublimable substance A and the sublimable substance B were mixed at a molar ratio of 4:1. The sublimable substances and the sublimation suppression material A were weighed in such an amount that the ratio of the sublimable substances became 99.85 mol %, and the ratio of the sublimation suppression material A became 0.15 mol %, with respect to the total of the sublimable substances and the sublimation suppression material A. After that, the sublimable substances and the sublimation suppression material A were mixed with a shaker (manufactured by Yayoi, model: YGG) for 1 hour to provide a homogeneous powder.

2. Observation of Powder with SEM

Surfaces of particles of the sublimable substances of the powder obtained above were observed with a SEM. Particles of the sublimation suppression material strongly covered the surfaces of the particles of the sublimable substances by a van der Waals force or the like, and were not easily peeled off. In addition, a SEM image was binarized with software called Image-J to determine a coverage from its area ratio. Ten points were randomly selected from the SEM image, and an average value of the coverages calculated in the ten points was adopted as the coverage. The results are shown in Table 5.

3. Manufacture of Shaped Object

A shaped object was manufactured with an apparatus illustrated in FIG. 3. First, the powder obtained above was stored in a powder container 122. A step including vacuuming a chamber 101 and then introducing a $N_2$ gas was performed a plurality of times to purge the chamber 101 with a $N_2$ atmosphere. A heater in a shaping container 120 was set to 40° C., and the powder and the base plate 121 were heated. The raw material powder in the powder container 122 was supplied onto a shaping stage 108 to be laid on the base plate 121 made of stainless steel so as to have a uniform thickness by a powder laying mechanism 107. The height of the shaping stage 108 was adjusted so that the thickness of the powder became 50 μm.

Subsequently, the powder was shaped through laser irradiation under the following conditions. A defocus amount of the laser light 112 was set by moving the stage up and down. The space energy density JV at this time is calculated to be 11 J/mm$^3$ or more and 250 J/mm$^3$ or less.

<Conditions>

[Laser] Nd: YAG laser having wavelength of 1,060 nm

[Irradiation Position] Position at which shaping stage is moved down from focus position by 7 mm

[Scanning Speed] From 200 mm/sec to 4,500 mm/sec

After the completion of subjecting the first layer to laser irradiation, the powder laying of the powder and the laser irradiation were performed again, and the procedure was repeated until the shaped object had a desired height. Stainless steel used for the base plate 121 has a comparably high thermal conductivity, and hence irradiation heat of the laser applied dissipates. Accordingly, adhesiveness between the shaped object and the base plate 121 may be reduced. Accordingly, in addition to the usage of the heater, the shaping may be performed by increasing the space energy density JV to 22 J/mm$^3$ or more and 500 J/mm$^3$ or less, which is twice as high as that of the above-mentioned irradiation conditions, for the first layer to the third layer.

Dispersion irradiation was performed with laser light. Specifically, an irradiation area was set to a square 1 mm on a side and a distance between centers of adjacent squares was set to 0.8 mm, and adjacent irradiation areas were overlapped by 0.1 mm. Of the two solidified layers to be continuously formed, in the solidified layer to be formed later, an angle in the shaping plane was rotated by 18° while the irradiation area was moved in parallel in a constant direction in the shaping surface by 0.25 mm with respect to the solidified layer formed in advance. With those designs, temperature uniformity in the shaping surface is secured, and hence a shaped object having a comparably high strength can be obtained.

4. Calculation of Filling Ratio of Shaped Object

A density of the shaped object was calculated from its volume and mass. The value was divided by the density of silicon carbide of 3.21 g/cm$^3$ to calculate the filling ratio of the shaped object. The filling ratio was evaluated by the following criteria. The results are shown in Table 5.

A: 70% or more

B: 60% or more and less than 70%

C: 50% or more and less than 60%

D: 40% or more and less than 50%

Example 2

The sublimable substance A and the sublimable substance C were mixed at a molar ratio of 4:1 in the same manner as in Example 1. The sublimable substances and the sublimation suppression material A were weighed in such an amount that the ratio of the sublimable substances became 99.85 mol %, and the ratio of the sublimation suppression material A became 0.15 mol %, with respect to the total of the sublimable substances and the sublimation suppression material A. After that, the sublimable substances, the sublimation suppression material A, and the eutectic formation material A were mixed in the same manner as in Example 1 to provide a homogeneous powder, and the SEM observation was performed in the same manner as in Example 1 to measure the coverage. The particles of the sublimation suppression material were not easily peeled off in the same manner as in Example 1. The coverage is shown in Table 5.

A shaped object was manufactured, and its filling ratio was calculated and evaluated in the same manner as in Example 1 except that the powder was used. The results are shown in Table 5.

Example 3

The sublimable substance A and the sublimable substance D were mixed at a molar ratio of 4:1 in the same manner as in Example 1. The sublimable substances and the sublimation suppression material A were weighed in such an amount that the ratio of the sublimable substances became 99.85 mol %, and the ratio of the sublimation suppression material A became 0.15 mol %, with respect to the total of the sublimable substances and the sublimation suppression material A. After that, the sublimable substances, the sublimation suppression material A, and the eutectic formation material A were mixed in the same manner as in Example 1 to provide a homogeneous powder, and the SEM observation was performed in the same manner as in Example 1 to measure the coverage. The particles of the sublimation suppression material were not easily peeled off in the same manner as in Example 1. The coverage is shown in Table 5.

A shaped object was manufactured, and its filling ratio was calculated and evaluated in the same manner as in Example 1 except that the powder was used. The results are shown in Table 5.

Example 4

The sublimable substance A and the sublimable substance B were mixed at a molar ratio of 3:2 in the same manner as in Example 1. The sublimable substances and the sublimation suppression material A were weighed in such an amount that the ratio of the sublimable substances became 99.85 mol %, and the ratio of the sublimation suppression material A became 0.15 mol %, with respect to the total of the sublimable substances and the sublimation suppression material A. After that, the sublimable substances, the sublimation suppression material A, and the eutectic formation material A were mixed in the same manner as in Example 1 to provide a homogeneous powder, and the SEM observation was performed in the same manner as in Example 1 to measure the coverage. The particles of the sublimation suppression material were not easily peeled off in the same manner as in Example 1. The coverage is shown in Table 5.

A shaped object was manufactured, and its filling ratio was calculated and evaluated in the same manner as in Example 1 except that the powder was used. The results are shown in Table 5.

Example 5

The sublimable substance A and the sublimable substance B were mixed at a molar ratio of 95:5 in the same manner as in Example 1. The sublimable substances and the sublimation suppression material A were weighed in such an amount that the ratio of the sublimable substances became 99.85 mol %, and the ratio of the sublimation suppression material A became 0.15 mol %, with respect to the total of the sublimable substances and the sublimation suppression material A. After that, the sublimable substances, the sublimation suppression material A, and the eutectic formation material A were mixed in the same manner as in Example 1 to provide a homogeneous powder, and the SEM observation was performed in the same manner as in Example 1 to measure the coverage. The particles of the sublimation suppression material were not easily peeled off in the same manner as in Example 1. The coverage is shown in Table 5.

A shaped object was manufactured, and its filling ratio was calculated and evaluated in the same manner as in Example 1 except that the powder was used. The results are shown in Table 5.

Example 6

The same sublimable substances as those in Example 1 and the sublimation suppression material A were weighed in such an amount that the ratio of the sublimable substances became 99.85 mol %, and the ratio of the sublimation suppression material A became 0.15 mol %, with respect to the total of the sublimable substances and the sublimation suppression material A. Further, the eutectic formation material A was weighed in such an amount that the ratio "x" of the eutectic formation material A became 37.5 mol % with respect to the total of the sublimable substances and the eutectic formation material A. After that, the sublimable substances, the sublimation suppression material A, and the eutectic formation material A were mixed in the same manner as in Example 1 to provide a homogeneous powder, and the SEM observation was performed in the same manner as in Example 1 to measure the coverage. The particles of the sublimation suppression material were not easily peeled off in the same manner as in Example 1. The coverage is shown in Table 5.

A shaped object was manufactured, and its filling ratio was calculated and evaluated in the same manner as in Example 1 except that the powder was used. The results are shown in Table 5.

Examples 7 to 10 and Comparative Examples 1 to 4

Powders and shaped objects were each manufactured, and filling ratios of the shaped objects were each evaluated in the same manner as in Example 1 or 2 except that the powder composition was changed as shown in Table 5. The results are shown in Table 5. Particles of the sublimation suppression material in each of the powders of Examples 3 to 6 were not easily peeled off in the same manner as in Example 1.

following result was obtained: the filling ratio was improved by using $SiO_2$ as the sublimation suppression material to cover surfaces of silicon carbide particles. In addition, as described in Example 9, as the kind of the sublimation suppression material, the effect was also observed in an $Al_2O_3$ powder having a higher boiling point than that of $SiO_2$. In addition, when the eutectic formation material was incorporated as in Examples 6 to 8, the filling ratio was increased by from 10% to 15% as compared to Example 1 being free of any eutectic formation material to become 70% or more.

Examples 11 to 20

The shaped objects of Examples 1 to 10 each having the filling ratio evaluated as A or B, i.e., satisfactory, were each observed with a microscope. As a result, pores were observed, and hence the shaped objects of Examples 1 to 10 were each subjected to solid phase impregnation.

A sufficient amount of a liquid phenol resin (product available under the product name "PR-50607B" from Sumitomo Bakelite Co., Ltd.) was dropped onto each of the shaped objects of Examples 1 to 10, followed by defoaming in a vacuum. An excess phenol resin on the surface of the shaped object was wiped off, and then heating was performed on a hot plate at 160° C. to thermally cure the phenol resin. A cut surface of the shaped object having impregnated therein the phenol resin was observed with a microscope. As a result, a state in which the phenol resin was sufficiently impregnated in the pore was able to be observed.

After the impregnation of the phenol resin, the volume and weight of the shaped object were measured to measure a porosity. The amount of silicon needed for impregnation was calculated from the measured result of the porosity. Balls made of alumina each having a size of 42 mm were laid and arranged as setters on the bottom surface of a crucible made of alumina in advance so that the shaped object was prevented from being brought into close contact with the crucible. Then, the shaped object was arranged in the crucible. A silicon piece or a silicon powder was placed thereon in an amount larger than the needed amount of silicon calculated by about 20%, and heat treatment was performed. The heat treatment was performed as follows: heating was performed at 1,600° C. for from 1 hour to 7 hours in a $N_2$ atmosphere having a pressure of 2,000 Pa. Thus, an article was obtained.

TABLE 5

| | | | Example | | | | | | | | | | Comparative Example | | | |
|---|---|---|---|---|---|---|---|---|---|---|---|---|---|---|---|---|
| | | | 1 | 2 | 3 | 4 | 5 | 6 | 7 | 8 | 9 | 10 | 1 | 2 | 3 | 4 |
| Composition | Sublimable substance | Ratio [mol %] | 99.85 | 99.85 | 99.85 | 99.85 | 99.85 | 99.85 | 99.85 | 99.85 | 99.85 | 98.70 | 100.00 | 100.00 | 100.00 | 100.00 |
| | Sublimation suppression material | Kind | A | A | A | A | A | A | A | A | B | A | — | — | — | — |
| | | Ratio [mol %] | 0.15 | 0.15 | 0.15 | 0.15 | 0.15 | 0.15 | 0.15 | 0.15 | 0.15 | 1.30 | — | — | — | — |
| | Eutectic formation material | Kind | — | — | — | — | — | A | B | C | — | — | — | A | B | C |
| | | Ratio "x" [mol % ] | — | — | — | — | — | 37.5 | 25.0 | 13.0 | — | — | — | 37.5 | 25.0 | 13.0 |
| Coverage [%] | | | 25 | 25 | 25 | 25 | 25 | 25 | 25 | 25 | 25 | 94 | 0 | 0 | 0 | 0 |
| Filling ratio evaluation | | | B | B | B | B | B | A | A | A | B | B | D | C | C | C |

From the comparison between Examples 1 to 8 and Comparative Examples 1 to 4 as shown in Table 5, the The structure of the resultant article was observed with a microscope. As a result, the article was able to be found to be sufficiently dense. In addition, the article was able to be found to have sufficient characteristics as a silicon carbide product by evaluating various physical properties.

According to the present disclosure, the article containing the sublimable substance can be manufactured at high density.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-032851, filed Mar. 3, 2023, and Japanese Patent Application No. 2024-008065, filed Jan. 23, 2024, which are hereby incorporated by reference herein in their entirety.

What is claimed is:

1. A powder for shaping through irradiation with an energy beam, the powder comprising:
- a sublimable substance; and
- a sublimation suppression material,
- wherein the sublimation suppression material is an inorganic compound, and
- wherein the powder includes a plurality of particles in which particles of the sublimation suppression material adhere to part of surfaces of particles of the sublimable substance, and
- wherein in the plurality of particles, a ratio of the sublimable substance is 90 mol % to 99.9 mol %, and a ratio of the sublimation suppression material is 0.1 mol % to 10 mol %, with respect to a total of the sublimable substance and the sublimation suppression material.

2. The powder according to claim 1, wherein the particles of the sublimation suppression material adhere to 5% to 95% of the surfaces of the particles of the sublimable substance.

3. The powder according to claim 1, wherein a particle diameter of each of the particles of the sublimation suppression material is 1/10 or less of a particle diameter of each of the particles of the sublimable substance.

4. The powder according to claim 1, wherein an average particle diameter of the particles of the sublimation suppression material is 10 nm to 300 nm.

5. The powder according to claim 1, wherein an average particle diameter of the particles of the sublimable substance is 5 μm to 50 μm.

6. The powder according to claim 1, wherein, when a sublimation point of the sublimable substance is represented by Ts, one of a boiling point or a sublimation point of the sublimation suppression material is Ts/2 or more.

7. The powder according to claim 1, wherein the sublimation suppression material is one of an inorganic oxide, an inorganic nitride, or an inorganic carbide.

8. The powder according to claim 1, wherein the sublimation suppression material is at least one selected from the group consisting of $SiO_2$, $Al_2O_3$, $ZrO_2$, $Y_2O_3$, and MgO.

9. The powder according to claim 1, wherein the ratio of the sublimable substance is 98.5 mol % to 99.9 mol %, and the ratio of the sublimation suppression material is 0.1 mol % to 1.5 mol %.

10. A powder for shaping through irradiation with an energy beam, the powder comprising:
- a sublimable substance; and
- a sublimation suppression material,
- wherein the sublimation suppression material is an inorganic compound, and
- wherein the powder includes a plurality of particles in which particles of the sublimation suppression material adhere to part of surfaces of particles of the sublimable substance, and
- wherein the powder has a particle diameter distribution in which a plurality of peaks each having a frequency of 3% or more are present in a range of a particle diameter of from 0.5 μm to 200.0 μm.

11. The powder according to claim 10, wherein, when a first particle diameter of particles with a first peak of the plurality of peaks is represented by D(A) μm and a second particle diameter of particles with a second peak of the plurality of peaks is represented by D(B) μm, the powder satisfying the following formula (1):

$$0.1 \leq D(B)/D(A) \leq 0.8. \tag{1}$$

12. The powder according to claim 10, wherein, when a first particle diameter of particles with a first peak of the plurality of peaks is represented by D(A) μm, a second particle diameter of particles with a second peak of the plurality of peaks is represented by D(B) μm, and D(A) is larger than D(B), and
- wherein, when an integrated frequency ratio of the particles having a larger particle diameter than a particle diameter V between D(A) and D(B) is represented by F(A) and an integrated frequency ratio of the particles having a smaller particle diameter than the particle diameter V is represented by F(B), F(A) is larger than F(B).

13. The powder according to claim 12, wherein the integrated frequency ratio F(A) is 60% to 95%.

14. A powder for shaping through irradiation with an energy beam, the powder comprising:
- a sublimable substance;
- a sublimation suppression material; and
- a eutectic formation material for forming a eutectic with the sublimable substance,
- wherein the sublimation suppression material is an inorganic compound,
- wherein the powder includes a plurality of particles in which particles of the sublimation suppression material adhere to part of surfaces of particles of the sublimable substance, and
- wherein a particle diameter of each of particles of the eutectic formation material is larger than a particle diameter of each of the particles of the sublimation suppression material.

15. The powder according to claim 14, wherein the sublimable substance is silicon carbide.

16. The powder according to claim 14, wherein the eutectic formation material is a metal boride.

17. The powder according to claim 14, wherein the eutectic formation material is at least one selected from the group consisting of $HfB_2$, $ZrB_2$, $TiB_2$, $TaB_2$, $NbB_2$, $CrB_2$, CrB, $VB_2$, $LaB_6$, $B_4C$, $W_2B_5$, and $WB_2$.

18. The powder according to claim 14, wherein particles of the eutectic formation material are different from the particles of the sublimable substance.

19. The powder according to claim 14, wherein a particle diameter of each of particles of the eutectic formation material is smaller than a particle diameter of each of the particles of the sublimable substance.

20. The powder according to claim 14, wherein an average particle diameter of particles of the eutectic formation material is 1 μm to 20 μm.

21. A powder for shaping through irradiation with an energy beam, the powder comprising:

a sublimable substance;

a sublimation suppression material; and a eutectic formation material for forming a eutectic with the sublimable substance, wherein the sublimation suppression material is an inorganic compound, wherein the powder includes a plurality of particles in which particles of the sublimation suppression material adhere to part of surfaces of particles of the sublimable substance, and wherein a ratio "x" [mol %] of the eutectic formation material with respect to a total of the eutectic formation material and the sublimable substance satisfies one of formula (2) or (3):

$$Xe/4 \leq x < 3Xe/4 \tag{2}$$

$$(3Xe+100)/4 < x \leq (Xe+300)/4, \tag{3}$$

where in each of the formulae (2) and (3), Xe [mol %] represents a ratio of the eutectic formation material in a eutectic composition of the sublimable substance and the eutectic formation material.

22. The powder according to claim 21, wherein a particle diameter of each of particles of the eutectic formation material is larger than a particle diameter of each of the particles of the sublimation suppression material.

23. A method of manufacturing an article, the method comprising a plurality of times of each of:

forming a powder layer by laying a powder for shaping through irradiation with an energy beam; and irradiating the powder layer with the energy beam, wherein the powder is the powder according to claim 1.

24. A method of manufacturing an article, the method comprising a plurality of times of each of:

forming a powder layer by laying a powder for shaping through irradiation with an energy beam; and irradiating the powder layer with the energy beam, wherein the powder is the powder according to claim 10.

25. A method of manufacturing an article, the method comprising a plurality of times of each of:

forming a powder layer by laying a powder for shaping through irradiation with an energy beam; and irradiating the powder layer with the energy beam, wherein the powder is the powder according to claim 14.

26. A method of manufacturing an article, the method comprising a plurality of times of each of:

forming a powder layer by laying a powder for shaping through irradiation with an energy beam; and irradiating the powder layer with the energy beam, wherein the powder is the powder according to claim 21.

* * * * *